Aug. 27, 1957    F. W. SCHREMP ET AL    2,804,148
METHOD AND APPARATUS FOR PROVIDING A RIGID TUBE IN A WELL BORE
Filed May 14, 1953    3 Sheets-Sheet 1

INVENTORS
FREDERIC W. SCHREMP
EDWARD R. HUTCHINSON
EDWARD L. HOPKINS
BY
ATTORNEYS

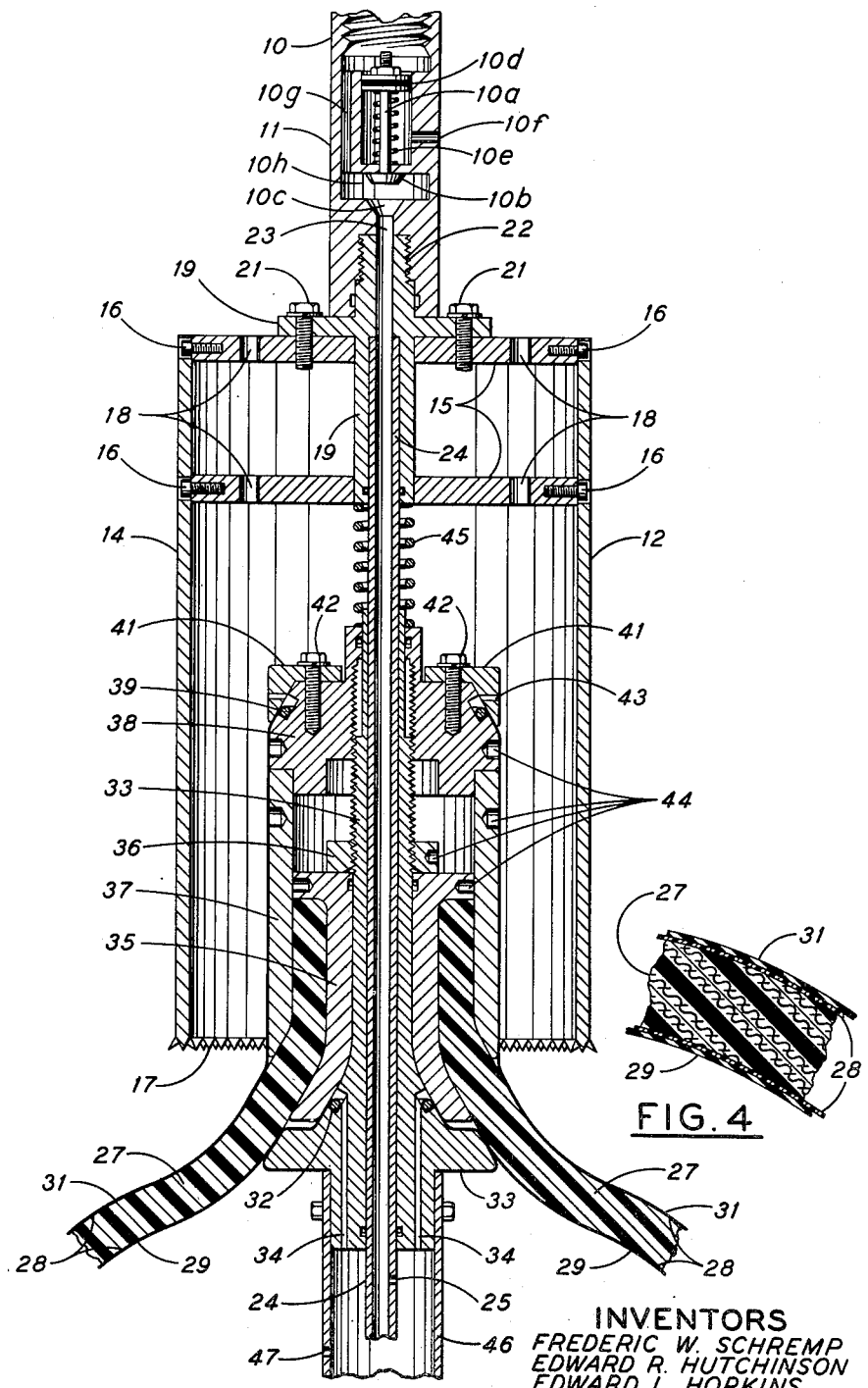

INVENTORS
FREDERIC W. SCHREMP
EDWARD R. HUTCHINSON
EDWARD L. HOPKINS
ATTORNEYS

United States Patent Office 2,804,148
Patented Aug. 27, 1957

2,804,148

METHOD AND APPARATUS FOR PROVIDING A RIGID TUBE IN A WELL BORE

Frederic W. Schremp and Edward R. Hutchinson, Fullerton, and Edward Lawrence Hopkins, Whittier, Calif., assignors to California Research Corporation, San Francisco, Calif., a corporation of Delaware Application May 14, 1953, Serial No. 354,994

8 Claims. (Cl. 166—33)

This invention relates to a method and apparatus for providing a circumferential wall in a porton of a subterranean well bore.

In the drilling of oil wells by the rotary method, the loss of drilling fluid into large-pored, highly-fractured, fissured or cavernous formations encountered in the well bore is often a serious problem. This loss, termed lost circulation, may comprise a gradual seepage of drilling fluid into a somewhat porous formation or may comprise a rapid flow of fluid into a cavernous formation. This latter type of loss is extremely damaging and may result in abandonment of the well if not remedied.

Many attempts have been made to solve this problem of circulation loss into cavernous formations without a great deal of success. In one of such attempted solutions, cement is pumped down the bore hole and into the cavernous formation with the expectency that the cement will fill the well bore in the cavernous zone. The cement may then be drilled through upon hardening for continuation of the well. However, when the cavernous zone is of substantial size, the above method is impractical since the cement flows away into the cavernous formation as quickly as it is pumped down the well bore, making bridging of the cavernous zone impossible without the use of a prohibitive amount of cement. A similar method has been proposed in which a polymerizable resin replaces the cement of the above method. The resin is cured by the heat in the bore hole to form a solid plug. However, this method is subject to the same disadvantage as the use of cement and has the further disadvantage of increased cost.

It has also been proposed to lower a bag of elastic material, such as rubber, into the bore hole and fill the bag with cement, the expectancy being that the bag will confine the cement to a reasonable area around the bore hole prior to hardening of the cement. An additional proposed solution utilized an expansible tube of canvas and wire which was placed adjacent the loss zone and filled with cement to confine the cement in position during hardening.

Broadly, the present invention contemplates a method and apparatus for inserting a bridging member in a well bore or in equipment associated with the well bore, which method and apparatus utilizes an expansible, resin-containing fabric sleeve, foldable for insertion into the well bore. When the sleeve is in the desired position, it is expanded and the resin therein cured to rigidify the sleeve.

It is, therefore, an object of this invention to provide an improved method and apparatus for providing a circumferential wall in a well bore.

It is an additional object of this invention to provide an improved method and apparatus for remedying lost circulation in the rotary drilling of a well bore.

It is an additional object of this invention to provide a method and apparatus for inserting a rigid tube member in a well bore or in equipment associated with the well bore, which method and apparatus utilizes an expansible, resin-containing fabric sleeve which is positioned in the well bore and the resin therein cured to rigidify the sleeve.

Objects and advantages other than those set forth above will be readily apparent from the following description when read in connection with the accompanying drawing, in which:

Fig. 3 is a side view in section of the top portion of the sleeve clamping means of Figs. 1 and 2.

Fig. 4 is a side view in section of a portion of the expansible resin-containing fabric sleeve of Fig. 3.

Figure 1:
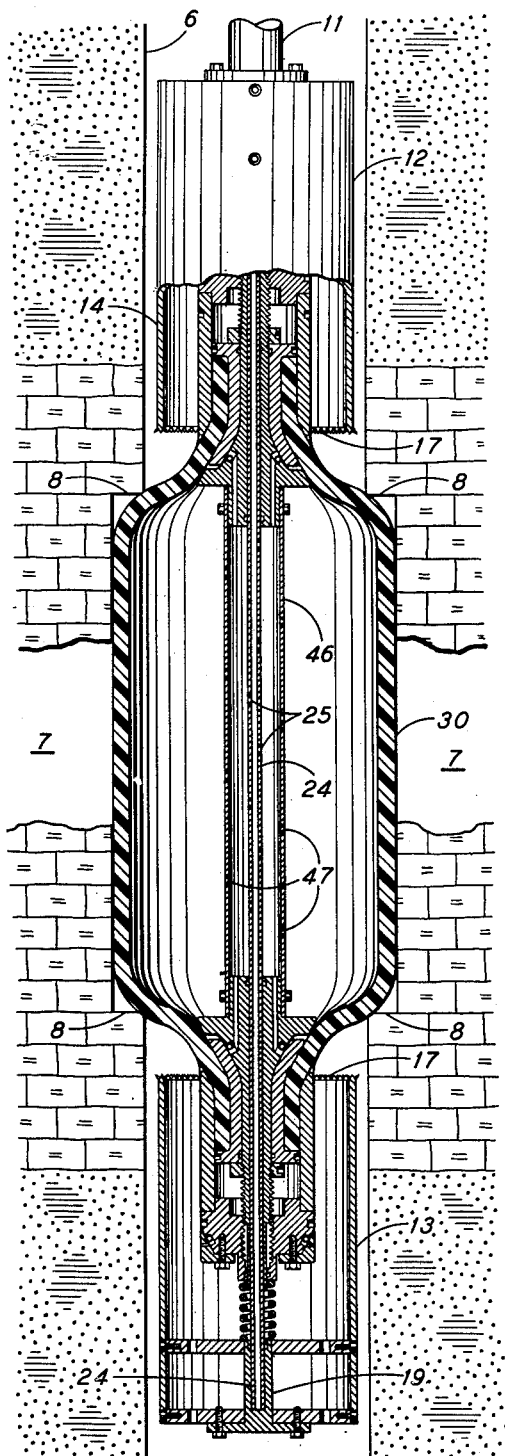
Fig. 1 is a side view, partly in section, of the preferred embodiment of the invention utilized in connection with the bridging of a cavernous zone, with the fabric sleeve clamped to a tool and in the expanded position.

Referring to Fig. 1, the invention is illustrated in connection with the sealing of a pervious formation encountered in the drilling of a well bore defined by wall 6. The well bore has encountered a porous formation into which the rotary drilling fluid is escaping. Such pervious formation may comprise a formation of sufficient porosity to permit the drilling fluid to escape at a slow rate, or the formation may comprise, as shown, a cavernous zone 7 into which the drilling fluid flows at a high rate.

Figure 2:
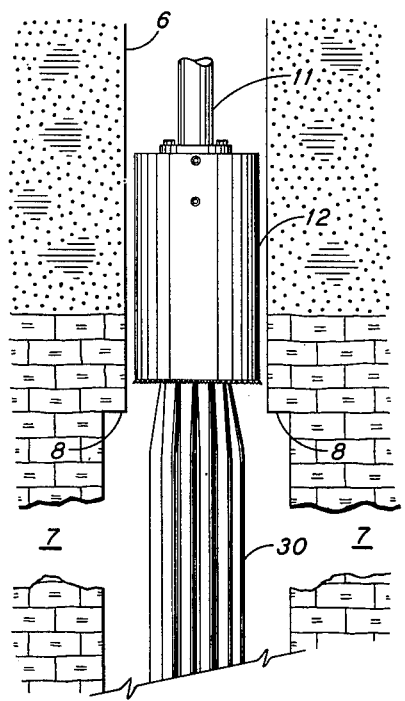
Fig. 2 is a side view similar to Fig.1, of the preferred embodiment of the invention with the fabric sleeve in the folded or unexpanded position.

The first step in the remedying of this lost fluid circulation by the method of this invention, after determining the location of the loss zone by any suitable known means, is to under-ream the walls of the well bore by any suitable known means above and below the loss zone to provide shoulder portions 8, as shown in Figs. 1 and 2. After underreaming, the drill is withdrawn and the tool of this invention is attached to the drill string and lowered into position adjacent the loss zone. The tool includes a stem portion 11 which is adapted to engage the threaded end of a standard oil field tool joint to secure the tool to the drill string.

As shown in detail in Fig. 3, stem portion 11 is provided with a differential pressure valve 10 for controlling the pressure of the fluid utilized to expand the fabric sleeve. Valve 10 comprises a valve stem 10a provided with a valve head 10b which seats in a valve seat 10c in stem 11. Stem 10a is secured to a piston 10d, and a spring 10e is compressed between piston 10d and the valve body to urge the valve head 10b to the open position shown in Fig. 3. A port 10f extends through stem 11 into the valve chamber housing spring 10e to introduce a biasing force on the valve in the same direction as spring 10e. A plurality of circumferentially-spaced ports 10g supply inflating fluid from the drill string to a valve chamber 10h and valve seat 10c. Valve stem 11 may be provided with a choke or restricted opening above piston 10d to restrict the flow of fluid through valve 10.

The tool further includes substantially similar upper and lower units 12, 13. Upper unit 12, as shown in detail in Fig. 3, comprises a cylindrical telescoping hole saw member 14 having circumferential reinforcing plates 15 secured thereto by bolts 16 and provided with saw teeth 17 spaced about its lower edge. Plates 15 are provided with a plurality of ports 18 to permit fluid to flow therethrough. Member 14 includes a coupling member 19 which is secured to upper plate 15 by bolts 21 and which is provided with a threaded stud 22 engaging a tapped opening in stem 11.

Coupling member 19 is provided with an axial opening 23 extending therethrough and communicating with valve seat 10c in stem 11. The lower portion of opening 23 is enlarged to receive a ported conduit or pipe 24 provided with ports 25. Conduit 24 is secured to member 19 by any suitable known means, such as a press fit, and extends throughout a substantial length of the tool.

Figure 6:
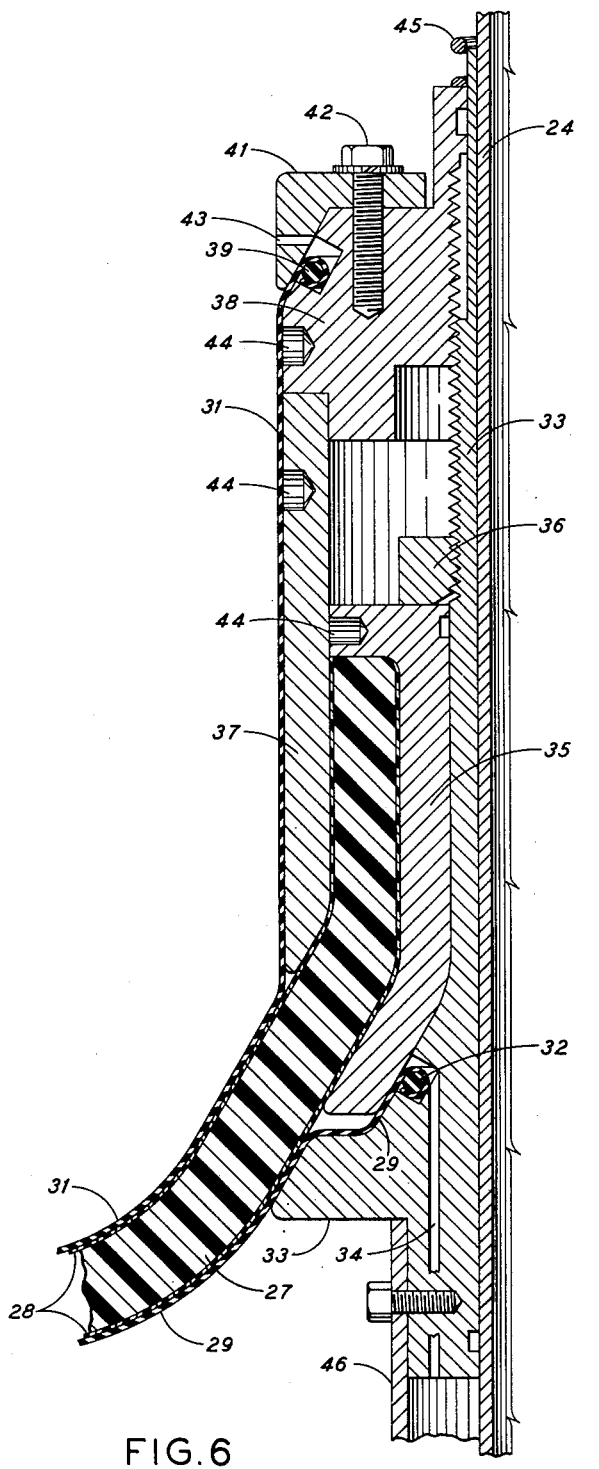
Fig. 6 is a side view in section on an enlarged scale of a portion of the sleeve-clamping means of Fig. 3.

Mounted within member 14 is the clamping means for securing the expansible casing member to the tool. The casing member is preferably cylindrical in shape and is adapted to be pleated or folded, as shown in Fig. 2, for insertion within the well bore. The casing may be composed of any suitable material having the required strength, such as Fiberglas, nylon, Orlon, Fortisan or Dacron. We have found that a sleeve 27 composed of a plurality of layers of Fiberglas cloth reinforced with a suitable resin is very satisfactory. As shown in Fig. 4, the glass cloth sleeve 27 may be used uncovered or may be encased in an envelope 28 of cellophane. Additionally, an inner rubber sheath 29 and an outer rubber sheath 31 surrounding cellophane envelope 28 may be provided to form a casing member 30 comprising sleeve 27, envelope 28 and sheaths 29, 31. Cellophane envelope 28 prevents the rubber sheaths 29, 31 from reacting with the resin in sleeve 27. Sheaths 29, 31 serve to distribute the force applied to sleeve 27 evenly over the sleeve and act to prevent abrasion of sleeve 27 and envelope 28 during lowering of the tool into the well bore. As best shown in Fig. 6, inner sheath 29 is wrapped around a rubber O ring 32 which is seated in a notch in the inflating tool mandrel shank 33. A pair of ports 34 provide communication between the lower end of shank 33 and the notch in which O ring 32 is seated, to equalize the pressure on ring 32. A clamp ring 35, which fits over shank 33, is provided to clamp inner sheath 29 between the outwardly-tapering lower portion of shank 33 and the flanged portion of clamp ring 35. Clamp ring 35 is held in place by a nut 36 engaging the threaded portion of shank 33.

The cellophane covered glass cloth sleeve 27 is clamped between the clamp ring 35 and a clamp ring 37. Clamp ring 37 is held in position by a clamp ring nut 38 having a tapped portion engaging the threaded portion of shank 33. Outer sheath 31 is wrapped around a rubber O ring 39 resting in a notch in clamp ring nut 38, and a clamp ring 41 adjustably secured to clamp ring lock nut 38 by a bolt 42 has a clamping face which firmly clamps sheath 31 against the sloping side of clamp ring nut 38. Clamp ring 41 is provided with ports 43 communicating with the notch in which O ring 39 is seated to equalize the pressure on all sides of ring 39. Clamp rings 35, 37 and clamp ring nuts 36, 38 may be provided with sockets 44 for the insertion of spanner wrenches in adjusting the clamping means. A spring 45 is compressed between clamp ring nut 38 and coupling member 19 to urge the telescoping portion of housing 12 away from the clamping means.

As shown in Fig. 1, lower unit 13 is substantially identical to upper unit 12, and, consequently, identical reference numerals have been used to designate similar components of the two units. The only difference between units 12, 13 is that, whereas in upper unit 12 coupling member 19 is provided with a bore communicating with the bore of stem portion 11 to provide communication between the bore of stem portion 11 and conduit 24, member 19 of lower unit 13 is not provided with a bore extending completely therethrough, so that the lower end of conduit 24 is sealed. The upper and lower inflating tool mandrel shanks 33 are rigidly secured together by a length of conduit 46 which is concentric with conduit 24 and which is provided with a plurality of ports 47 communicating with the interior of casing member 30. Thus, communication is established from the bore of stem 11, through valve 10, bore 23, conduit 24, ports 25, conduit 46 and ports 47 into casing member 30. The above recited elements comprise a composite mandrel which is made up of an outer mandrel including elements 46, 33, 35, 37, 41, 36, 38, and an inner mandrel comprising elements 24, 19 and 11. The inner mandrel is telescopically mounted within the outer mandrel and carries the saw member 14.

Prior to lowering the assembled tool into the well bore, the fabric sleeve 27 has applied thereto a thermosetting resin of a suitable type. Such application may be made immediately prior to lowering the sleeve into the well bore if the resin utilized has a short shelf life and tends to cure quickly. If the resin used has a long shelf life, the resin may be applied a considerable time prior to use of the casing. The application of the resin may be made by brushing, immersion or vacuum impregnation, depending upon the nature of the resin and fabric utilized. The polyester resins appear to be most suitable, although other thermosetting resins such as the epons, urea formaldehydes, phenol formaldehydes resorcinol formaldehydes, and furanes may be utilized. The polyester resin is preferably catalyzed with an organic peroxide, such as benzoyl peroxide or methyl ethyl ketone peroxide, and an accelerator, such as cobalt naphthenate, also may be utilized. Inhibitors such as a substituted quinone may be used to prevent undesired cure of the resin at low temperature prior to insertion into the well bore.

The assembled tool is lowered on a drill string into position adjacent the loss zone, with resin-containing casing member 30 pleated, as shown in Fig 2, or otherwise suitable folded, for entry into the bore hole. Ports 18 in plates 15 serve to bypass part of the drilling fluid through which the tool is lowered to reduce the drag on the tool during lowering. The upper end of the drill string is connected to a source of fluid under pressure, such as drilling mud, and when casing member 30 is in position adjacent the formation to be bridged this fluid is pumped down the drill string. The chamber of valve 10 below piston 10d communicates with the well bore through port 10f, so that as long as the pressure at valve level in the bore hole plus the pressure of spring 10e exceeds the pressure of the inflating fluid in ports 10g, piston 10d is forced upward to lift valve head 10b off valve seat 10c to thereby permit the fluid under pressure to flow into bore 23 and conduit 24. The pressure fluid flows from conduit 24 through ports 25 into conduit 46 and thence through ports 47 into casing member 30. The action of the pressure fluid expands casing member 30 from the pleated position shown in Fig. 2 to the fully-expanded position shown in Fig. 1. In the fully-expanded position, the neck of casing member 30 preferably is wedged into and abuts the underreamed well bore shoulder portions 8 which provide a seat for firmly securing the casing member 30 in position.

Differential pressure valve 10 operates to maintain a predetermined excess of pressure on the inside of casing member 30 over the outside bore hole pressure to retain casing member 30 in the expanded position during curing of the resin. The resin is preferably selected to be polymerizable within a reasonable length of time at the temperature encountered in the bore hole. The casing member 30 and tool remain in position until the resin is cured to thus rigidify the casing.

To remove the tool from the well after the resin is completely cured, weight is applied to the drill string to force shank 11 and upper telescoping hole saw member 14 down against the action of spring 45 until teeth 17 of the saw engage the upper neck of casing member 30. The drill string is then rotated to cause teeth 17 to sever casing member 30 along the line of engagement of the saw. The drill string is then lifted to force lower hole saw member 14 up against the action of lower spring 45 until teeth 17 of the lower saw member engage the lower neck of casing member 30. The drill string is then again rotated to cause lower teeth 17 to sever the casing member from the clamping means. The saw member may be provided with shear pins or other suitable known means to prevent premature movement of the saw member relative to the casing member prior to curing of the resin, to thereby prevent undesired abrasion of casing member 30 during lowering of the tool into the well bore. The drill string and tool may then be withdrawn from the bore hole, leaving rigidified casing member 30 in position to form a continuation of the bore hole wall through the loss zone 7. The rotary drilling operation may then be continued in the regular manner, since rigidified casing member 30 has sufficient strength to withstand the difference between the drilling fluid pressure and the formation pressure.

Although the above-described embodiment utilized drilling mud as an inflating fluid, it will be readily apparent that many other pressure fluids may be used. If additional heat is desired to shorten the resin cure time, suitable electrical heating means may be utilized, or a heat-evolving chemical reaction may be produced inside the sleeve by the introduction of suitable chemicals into the inflating fluid.

Figure 5:
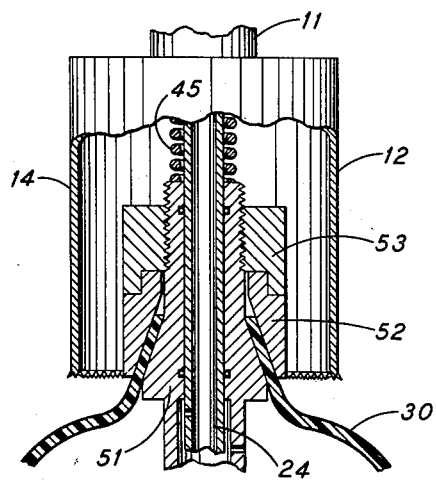
Fig. 5 illustrates a portion of an alternate clamping means.

The clamping means illustrated in detail in Fig. 3 is the preferred type of clamping means, since the individual clamping of inner sheath 29, sleeve 27 and outer sheath 31 provides maximum protection against the entrance of contaminating fluids into the ends of the resin-impregnated sleeve 27 and provides surer operation of the apparatus at high inflating pressures. In an alternate embodiment of the clamping means, illustrated in Fig. 5, casing member 30 is clamped between the sloping face of a mandrel shank 51 and a complementary sloping face of a clamp ring 52. A clamp ring nut 53 engages a threaded stud of shank 51 for adjustment of the clamping ring 52. Casing member 30 is thus compressed between the complementary sloping faces to provide a fluid-tight seal between the casing member 30 and shank 51.

Although the invention has been illustrated in connection with the bridging of a cavernous zone, it will be readily apparent that the invention is equally applicable to the repair of a leaking section of well casing. In this latter use, of course, no underreaming of the well bore is required. The sleeve is lowered into position adjacent the leaking area and expanded to force the sleeve firmly against the well casing during curing of the resin. The ends of the sleeve may then be sawed as described above, leaving the body of the sleeve firmly pressed against the well casing and covering the leaking portion thereof.

Similarly, it will be seen that the fabric sleeve of this invention may be utilized as a well liner in lieu of a conventional metallic liner. The sleeve is lowered into position in the producing formation and expanded as described above to press firmly against the well bore wall. Upon curing of the resin and consequent regidification of the sleeve, the sleeve ends are sawed and suitable known perforating means may be utilized to perforate the sleeve for admission of production fluid.

Additionally, although the tool utilized in the illustrated embodiments is withdrawable from the well bore upon curing of the resin, it will be obvious that a tool of drillable material may be utilized which can be drilled through upon curing of the resin without removal of the tool.

We claim:
1. Apparatus for providing a rigid tube in a subterranean well bore comprising an expansible fabric sleeve containing a thermo-setting resin, a mandrel adapted to be inserted in said sleeve and connected to a drill string, clamping means on said mandrel for securing the ends of said sleeve in substantially fluid-tight relation to said mandrel, said sleeve being foldable to a diameter less than the diameter of said well bore for insertion of said sleeve into said bore adjacent said formation, conduit means extending through said mandrel and communicating with the interior of said sleeve, and a source of fluid under pressure connected to said conduit for expanding said sleeve.

2. Apparatus for sealing a cavernous formation encountered in a subterranean well bore comprising an expansible fabric sleeve containing a thermo-setting resin, the inside diameter of said sleeve, when expanded, being at least as great as the diameter of said well bore, a mandrel extending through said sleeve and adapted to be connected to a drill string, clamping means on said mandrel for securing the ends of said sleeve in substantially fluid-tight relation to said mandrel, said sleeve being foldable to a diameter less than said well bore diameter for insertion of said sleeve in said well bore adjacent said formation, conduit means extending through said mandrel and communicating with the interior of said sleeve, whereby fluid under pressure may be supplied to said sleeve through said conduit means to expand said sleeve, and a differential pressure valve jointly responsive to the pressure of said fluid and the pressure in said well bore connected to said conduit means for controlling the admission of said fluid to said sleeve, whereby said sleeve is expanded by said fluid and a predetermined pressure maintained within said sleeve during curing of said resin.

3. Apparatus for providing an inner lining for a tubing comprising an expansible fabric sleeve containing a thermo-setting resin, a mandrel extending through said sleeve, clamping means on said mandrel for securing the ends of said sleeve in substantially fluid-tight relationship to said mandrel, said sleeve being foldable to a diameter less than the diameter of the said tubing for insertion of said sleeve in said tubing, and conduit means extending through said mandrel and communicating with the interior of said sleeve, whereby fluid under pressure may be supplied to said sleeve through said conduit means for expanding said sleeve.

4. Apparatus for forming a rigid tube in a subterranean well bore comprising an expansible fabric sleeve impregnated with a thermo-setting resin, a composite mandrel extending through said sleeve, said composite mandrel comprising an inner mandrel adapted to be connected to a drill string and an outer mandrel, said inner mandrel being slidably and rotatably movable relative to said outer mandrel, clamping means on said outer mandrel for securing the ends of said sleeve in substantially fluid-tight relationship to said composite mandrel, said sleeve being folded to a diameter less than the diameter of said well bore for insertion of said sleeve in said well bore, conduit means in said inner mandrel communicating with the interior of said expansible sleeve, whereby said sleeve is expansible by fluid under pressure supplied to said inner mandrel through said drill string, and saw means connected to said inner mandrel and adapted to be operated by rotation of said inner mandrel and said drill string relative to said outer mandrel for severing said ends of said sleeve from said clamping means upon curing of said resin and rigidification of said sleeve.

5. Apparatus for sealing a cavernous formation encountered in a subterranean well bore comprising an expansible fabric sleeve impregnated with a thermo-setting resin, the inside diameter of said sleeve, when expanded, being at least as great as the diameter of said well bore, a composite mandrel extending through said sleeve, said composite mandrel comprising an inner mandrel adapted to be connected to a drill string and an outer mandrel, said inner mandrel being slidably and rotatably movable relative to said outer mandrel, clamping means on said outer mandrel for securing ends of said sleeve in a substantially fluid-tight relation to said composite mandrel, said sleeve being foldable to a diameter less than said well bore diameter for insertion of said sleeve in said well bore adjacent said formation, conduit means extending through said inner mandrel and communicating with the interior of said expansible sleeve, whereby said sleeve is expansible by fluid under pressure supplied to said inner mandrel through said drill string, a differential pressure valve connected to said conduit means for controlling the admission of said fluid to said sleeve, and saw means connected to said inner mandrel and adapted to be operated by rotation of said inner mandrel and said drill string relative to said outer mandrel for severing said ends of said sleeve from said clamping means upon curing of said resin and rigidification of said sleeve.

6. Apparatus for sealing a cavernous formation encountered in a subterranean well bore comprising an expansible fabric sleeve containing a thermo-setting resin, a cellophane envelope covering said sleeve, a first rubber sheath and a second rubber sheath covering said envelope, said sleeve, said envelope and said sheaths forming a casing member, the inside diameter of said casing member, when expanded, being at least as great as the diameter of said well bore, a composite mandrel extending through said casing member, said composite mandrel comprising an inner mandrel adapted to be connected to a drill string and an outer mandrel, said inner mandrel being slidably and rotatably movable relative to said outer mandrel, first clamping means on said outer mandrel for securing said first sheath in substantially fluid-tight relation to said composite mandrel, second clamping means on said outer mandrel for securing said sleeve and said envelope in substantially fluid-tight relation to said composite mandrel, third clamping means on said outer mandrel for securing said second sheath in substantially fluid-tight relation to said mandrel, conduit means extending through said inner mandrel and communicating with the interior of said casing member, whereby said casing member is expansible by fluid under pressure supplied to said inner mandrel through said drill string, and saw means connected to said inner mandrel and adapted to be operated by rotation of said inner mandrel and said drill string relative to said outer mandrel for severing said ends of said casing member from said clamping means upon curing of said resin in rigidification of said sleeve.

7. The method for providing a continuous wall for a well bore which penetrates a subterranean zone having voids in its structure comprising the steps of enlarging the diameter of said well bore from a point above said zone to a point below said zone, inserting an expansible thermo-setting resin impregnated sleeve of glass fiber laminated fabric into said well bore to a position adjacent the portion of enlarged diameter of the well bore, expanding said sleeve in the said portion of enlarged diameter, maintaining said sleeve in said expanded position during curing of said resin, and cutting off portions of said sleeve which protrude within the inner diameter of said well bore after curing of said resin and rigidification of said sleeve.

8. The method of forming a rigid tube in a subterranean well bore comprising the steps of securing an expansible fabric sleeve containing a thermo-setting resin in a fluid-tight relation to an inflating tool, lowering said tool and said sleeve into said well bore, supplying the pressure fluid to expand said sleeve, maintaining said sleeve in said expanded position during curing of said resin, and severing said sleeve from said inflating tool after rigidification of said sleeve.

References Cited in the file of this patent

UNITED STATES PATENTS

| | | |
|---|---|---|
| 1,834,434 | Starr | Dec. 1, 1931 |
| 2,504,462 | Sprague et al. | Apr. 18, 1950 |
| 2,618,344 | Turechek et al. | Nov. 18, 1952 |